United States Patent [19]
Erlandson

[11] 3,838,733
[45] Oct. 1, 1974

[54] CONTROL SYSTEM FOR MULTIPLE ZONE HEATING AND COOLING

[75] Inventor: Charles W. Erlandson, Louisville, Ky.

[73] Assignee: General Electric Company, Louisville, Ky.

[22] Filed: Aug. 1, 1973

[21] Appl. No.: 384,884

[52] U.S. Cl. ................................. 165/22, 165/26
[51] Int. Cl. ............................................. F24f 13/00
[58] Field of Search .............. 165/2, 22, 80, 26, 27, 165/28

[56] References Cited
UNITED STATES PATENTS
3,568,760  3/1971  Hogel .................................. 165/22
3,602,427  8/1971  Joesting .............................. 165/22

*Primary Examiner*—Charles Sukalo
*Attorney, Agent, or Firm*—Francis H. Boos

[57] ABSTRACT

A multiple-zone air conditioning system including a central heating source and a central cooling source for supplying conditioned air to a plurality of zones includes control circuitry comprising thermostat control means in each zone for operating the cooling source upon the call for cooling by any zone thermostat but operating the heating source only when all zone thermostats call for heating. Auxiliary zone heaters are provided for reheating cooling source air supplied to any zone when its thermostat calls for heating or less cooling.

8 Claims, 1 Drawing Figure

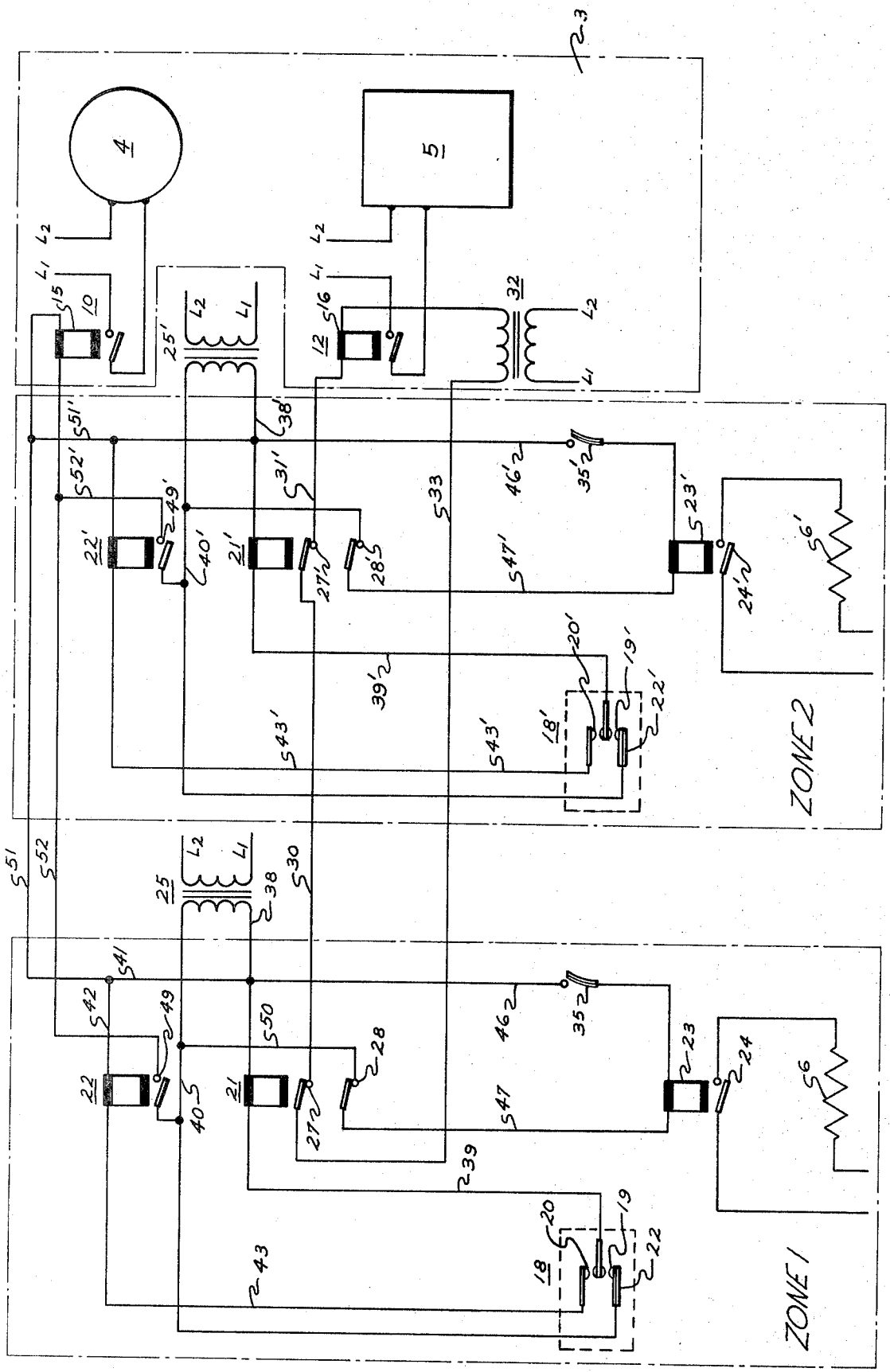

CONTROL SYSTEM FOR MULTIPLE ZONE HEATING AND COOLING

BACKGROUND OF THE INVENTION

The present invention relates to a multiple-zone air conditioning system comprising central cooling and heating means for supplying conditioned air to a plurality of zones.

It is well known that in the operation of multiple-zone air conditioning systems, the conditioning requirements of the various zones may vary, for example, to an extent such that while some of the zones require cooling, others at the same time require heating. Also, one or more zones may require heating or cooling to a lesser degree than others. In efforts to solve this problem, means have been provided for varying the volume of air supplied to each zone in accordance with its temperature requirements or auxiliary zone heaters have been provided in each zone for heating or reheating the central source air. Such systems are described and shown in U.S. Pat. No. 3,482,623-Betz. While systems such as that described in the Betz patent do compensate for varying zone requirements under conditions in which the central source operates either in the cooling or the heating mode, no provision is made for the extreme requirements in which some zones require cooling while others require heating.

The present invention is directed to the provision of an improved control for a multiple-zone air conditioning system in which the operation of the central source of conditioned air is controlled by the zone which requires the least heat or the most cooling and heated air is supplied from the central source only when all of the zones require heating.

SUMMARY OF THE INVENTION

In accordance with the illustrated embodiment of the invention, there is provided a multiple-zone air conditioning system comprising a central source for supplying either cooled or heated air to all of the zones and control circuitry including a zone thermostat means in each zone. The zone thermostat means is preferably a two-stage thermostat, such as a two-stage cooling thermostat, and its first and second stage contacts are so connected in the control circuitry as to provide cooled air from the central source to all of the zones upon a call therefor by any one of the zone thermostats and to supply heated air from the central source only upon the call therefor by all of the zone thermostats. The air conditioning system also includes zone auxiliary heaters and control means for energizing an individual zone heater upon the call for heating by the thermostat means associated with that zone regardless of the requirements of any of the remaining zones.

DESCRIPTION OF THE DRAWING

In the accompanying drawing, the single figure schematically illustrates the air conditioning system and controls employed in the practice of the present invention.

DESCRIPTION OF THE PREFERRED EMBODIMENT

Referring to the accompanying drawing, the air conditioning system of the present invention is illustrated in its use for maintaining desired temperatures in a plurality of zones 1 and 2, the central source 3 of the conditioned air including a source of cooled air such as a refrigeration system represented by a compressor 4 and a heating means 5 which may, for example, be an oil, gas-fired or electric furnace. The central cooling and heating means may also take the form of a heat pump operating on either a cooling cycle or a heating cycle. It will be understood that conditioned air from the central source is supplied through main and branch ducts to the zones 1 and 2 in accordance with the usual air conditioning practice employing a fan (not shown) for circulation of the conditioned air.

Disposed in each of the zone supply ducts or at the zone outlet ends thereof are auxiliary or zone electric resistance heaters such as heater 6 in zone 1. As all of the zones are shown as containing the same operational or control components, for explanation purposes the components in or operatively associated with zone 2 will be designated by corresponding numbers having a prime, the zone heater in zone 2 being indicated by the numeral 6'. The zone control components control the compressor 4 and heater 5. The operation of the compressor 4 is controlled through a relay 10 for connecting the compressor across high voltage lines L1, L2 while the operation of the heating means 5 is controlled through a relay 12 connecting the heating means across high voltage lines L1, L2.

The low voltage circuitry for controlling the energization of the coil 15 of relay 10 or the coil 16 of the relay 12 includes two-stage cooling thermostats 18, 18' positioned in the respective zones and having first stage contacts 19 and 19' and second stage contacts 20, 20'. Each of the zone thermostats includes a bimetal element 22 adapted upon an increase in temperature in a zone to first close the contacts 19 and upon a further increase in the zone temperature to close the contacts 20. Upon a decrease in a zone temperature, contacts 20 are first opened and with a further decrease in temperature, contacts 19 open. Each zone also has associated with its circuitry a low voltage, normally closed heating relay 21 and low voltage, normally open cooling relay 22. Each zone control is also indicated as including a low voltage relay 23 having high voltage switch means 24 for controlling the supply of line voltage to the zone or auxiliary heating means 6.

The power for the energization of the relays 21, 22 and 23 and the comparable relays in zone 2 is illustrated as being supplied from low voltage coils of one or more transformers 25, 25'.

The heating relay circuit for zone 1 includes the secondary of transformer 25, line 38, relay 21, line 39, thermostat contacts 19, and line 40. The cooling relay circuit comprises the secondary of transformer 25, lines 38, 41 and 42, relay 22, line 43, thermostat contacts 19 and 20, and line 40. The relays 21, 21' include, respectively, central source heating means control contacts 27 and 27' and auxiliary heater control contacts 28 and 28'. The normally closed heating relays 21, 21' must both be de-energized to complete a circuit energizing the heating relay coil 16 to thereby effect operation of the heating means 5. In other words, the first stage thermostat contacts 19, 19' must be open at which time all of the second stage contacts 20, 20' are also open. When the central source control contacts 27 and 27' which are connected in series with one another are closed, the central heating control relay 16 is energized. The complete control circuit includes switch contacts 27, line 30, contact 27', the secondary coil of a low voltage transformer 32, line 31, relay coil 16, and line 33 connected to switch 27. Thus, both of the switch contacts 27 and 27' must be made before the central source heating means 5 is operated. This circuitry is established, of course, when all zones call for heating and the heating contacts 19 and 19' of the two zone thermostats are both open.

Under the same temperature conditions in which thermostat contacts 19, 19' are open, the auxiliary heating relay contacts 28 and 28' respectively controlling the operation of the auxiliary heaters 6 and 6' are also closed. The control circuit for each auxiliary heater preferably also includes a duct thermostat switch 35 adapted to prevent energization of the associated zone heater 6 when heated air at the desired temperature is being supplied by the central source heating means 5. The low voltage circuit for zone heater relay 23 includes the secondary of transformer 25, lines 38 and 46, duct thermostat switch 35, line 47, relay 23, switch contacts 28 and line 50 connected to the other side of the secondary of the transformer 25. Thus, a zone heater will be energized whenever that zone calls for heat and the associated duct thermostat is closed.

Energization of either one of the relay coils 22 and 22' by closing of the contacts 20 or 20' of either of the thermostats will energize coil 15 of the relay 10 to operate the compressor 4, thus supplying cooled air to all zones since the heating relays 21, 21' are then open.

The energization of relay 22 closing its switch contact 49 completes a circuit including the compressor control relay coil 15, this circuit being traced from the transformer 25 through lines 38, 41, 51, relay coil 15, line 52, relay switch contacts 49, and line 40. The energization of coil 15 by relay 22 is independent of the operation of the relay 22' associated with zone 2. In a similar manner, the relay 22' can independently energize the compressor relay coil 15 from the secondary of transformer 25' through the leads 51' and 40' respectively connected to the leads 51 and 52.

From the above description it will be seen that there has been provided control circuitry for operating a central heating and cooling means and at the same time providing terminal, that is auxiliary, zone reheat in each of several zones in order to provide individual zone temperature control. The cooling circuit control relays for each zone are connected in parallel so that any zone requiring cooling will cause the central cooling means to operate. On the other hand, the heating circuit control relays are connected in series so that all zones must be calling for heat before the central heating system operates. This, in effect, provides a "traveling" control zone. In other words, the zone which requires the least heat (or the most cooling) will be the controlling zone. In addition, the auxiliary or zone heater control contacts 28 and 28' provide switch means operated concurrently with the central heating control switch means 27 and 27' to provide individual zone heating as required either until the central source heating system furnishes adequately heated air to the zones or to prevent over-cooling of any zone which at any time requires less cooling than the zone calling for cooling, i.e., the control zone.

It will be obvious that any particular zone may go from the heating mode to the cooling mode several times a day and the use of the two-stage thermostats 18 and 18' provides means for limiting the temperature "swing" in going from one mode to the other.

While individual control transformers 24 and 25' have been illustrated as associated with the respective zones 1 and 2, it will be obvious that a single transformer could be used and be located in a master control panel in the central source area, as may also be the relays 21, 21', 22 and 22' illustrated as being incorporated in each zone. In other words, the only components which are required to be physically associated with each zone are the thermostats 18 and 18', duct thermostats 35, 35', zone or auxiliary heaters 6 and 6' and, if desired, the usual protective control means such as thermal cutouts, air flow sensors and the like, not shown but normally provided in air conditioning systems of this type.

While there has been shown and described a specific embodiment of the present invention, it will be understood that it is not limited thereto. For example, two-stage heating thermostats could be used in place of two-stage cooling thermostats with the first stage controlling the normally closed cooling relays and the second stage controlling normally open double pole heating relays, these relays being respectively substituted in the disclosed circuitry for the relays 22 and 21. Accordingly, it is intended by the appended claims to cover all such modifications as fall within the true spirit and scope of the invention.

I claim:

1. A multiple-zone air conditioning system comprising a central source for supplying either cooled or heated air to all of said zones:

a zone thermostat means in each of said zones;
   control circuitry for supplying cooled air from said source upon a call therefor by any one of said zone thermostat means and supplying heated air to said zones only upon the call therefor by all of said zone thermostat means;
   a zone auxiliary heater in at least one of said zones and control means for energizing said zone heater upon the call for heating by the thermostat means in said one of said zones regardless of the requirements of another of said zones.

2. A system according to claim 1 in which said control circuitry thermostat means include heating contacts connected in series for controlling the supply of heated air.

3. A system according to claim 1 in which said thermostat means are two-stage thermostats.

4. A multiple-zone air conditioning system comprising:

a central source of conditioned air including cooling means and heating means;
   a zone means in each zone for receiving conditioned air from said central source, each of said means including auxiliary zone heating means;
   control circuitry for controlling the operation of said central source cooling and heating means and said auxiliary zone heating means;
   said circuitry including temperature control means including a thermostat in each zone responsive to the temperature of that zone;
   each of said temperature control means including central cooling control means, central heating control switch means and zone unit heat control switch means for operating said central source cooling means upon the call for cooling by any thermostat and operating said central source heating means only when all of said thermostats call for heating and individually operating an auxiliary zone heating means upon a call for heating by that zone;

said heating control switch means being series connected and said cooling control switch means being parallel connected.

5. A system according to claim 4 in which said thermostat is a two-stage thermostat and one of said control switch means is operated by the first stage of the thermostat and the other control switch means is operated by the second stage.

6. A multiple-zone air conditioning system comprising:

a central source of conditioned air including cooling means and heating means;

a zone means in each zone for supplying conditioned air from said central source to a zone, each of said zone means including auxiliary zone heating means;

control circuitry for controlling the operation of said central source cooling and heating means and said auxiliary zone heating means;

said circuitry including temperature control means including a two-stage thermostat in each zone responsive to the temperature of that zone;

each of said temperature control means including central heating control switch means, central cooling control switch means, and zone heating control switch means for operating said central source cooling means upon the call for cooling by any thermostat means, operating said central source heating means only when all of said thermostat means call for heating and individually operating an auxiliary zone heating means upon a call for heating by that zone;

each of said thermostat includes first stage heating contacts and second stage cooling contacts;

said control circuitry includes a normally closed zone heating relay de-energized by closing the first stage contacts and a normally open cooling relay controlled by the second stage thermostat contacts, the normally closed contacts of the zone heating relays being series connected.

7. A system according to claim 6 in which each zone heating relay also includes second normally closed contacts for energizing said zone unit heating means.

8. A system according to claim 7 including switch means responsive to the temperature of the central source air supplied to a zone for controlling the energization of said auxiliary zone heating means.

* * * * *